US012693025B2

(12) United States Patent
Nelson et al.

(10) Patent No.: US 12,693,025 B2
(45) Date of Patent: Jul. 28, 2026

(54) COOKTOP AND RESILIENT ELEMENT SUPPORT

(71) Applicant: Haier US Appliance Solutions, Inc., Wilmington, DE (US)

(72) Inventors: Nathan Ernell Nelson, Louisville, KY (US); Andrea Nichole Stokes, Louisville, KY (US); Adam Joseph Sollman, Shepherdsville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 947 days.

(21) Appl. No.: 17/747,207

(22) Filed: May 18, 2022

(65) Prior Publication Data

US 2023/0400190 A1 Dec. 14, 2023

(51) Int. Cl.
*F24C 15/10* (2006.01)
*F24C 7/06* (2006.01)
*H05B 3/74* (2006.01)

(52) U.S. Cl.
CPC ............ *F24C 15/102* (2013.01); *F24C 7/067* (2013.01); *H05B 3/74* (2013.01)

(58) Field of Classification Search
CPC ........ F24C 15/08; F24C 15/102; F24C 7/067; H05B 2206/022; H05B 3/74; H05B 6/1209
USPC ..................................................... 219/452.11
See application file for complete search history.

(56) References Cited

U.S. PATENT DOCUMENTS

| | | | | |
|---|---|---|---|---|
| 3,632,983 A * | 1/1972 | Dills | F24C 15/108 | 219/465.1 |
| 4,900,899 A * | 2/1990 | Schreder | F24C 7/067 | 219/448.11 |
| 10,458,659 B2 | 10/2019 | Pille | | |

FOREIGN PATENT DOCUMENTS

| | | |
|---|---|---|
| DE | 3204760 A1 | 8/1983 |
| DE | 19721776 C2 | 3/2001 |
| EP | 2784396 B1 | 4/2017 |
| WO | WO2008148769 A2 | 12/2008 |

* cited by examiner

*Primary Examiner* — Sang Y Paik
(74) *Attorney, Agent, or Firm* — Dority & Manning, P.A.

(57) ABSTRACT

A cooktop appliance may include a cooktop plate, a support panel, a raised ridge, a mounting spring, a heater frame, and an electric heating element. The cooktop plate may define an upper cooking surface. The support panel may be disposed below the cooktop plate. The raised ridge may be disposed on the support panel. The raised ridge may define an elevated surface above the support panel. The mounting spring may be mounted to the raised ridge and extend above the elevated surface. The heater frame may be supported on the mounting spring below the cooktop plate. The electric heating element may be mounted within the heater frame below the cooktop plate.

19 Claims, 6 Drawing Sheets

COOKTOP AND RESILIENT ELEMENT SUPPORT

FIELD OF THE INVENTION

The present subject matter relates generally to cooktop appliances having one or more heating elements, including features for supporting such heating elements.

BACKGROUND OF THE INVENTION

Certain cooktop appliances include electric heating elements for heating pots, pans and other containers with food items therein. The electric heating elements can be operated at various settings. For example, the electric heating elements can be operated at a low heat setting to simmer food items, or the electric heating elements can be operated at a high heat setting to boil water or fry food items.

In some cooktop appliances, the heating elements are mounted below a cooking surface, such as might be defined by a cooktop plate. For instance, induction or radiant heating elements may be disposed directly beneath the cooktop plate. Oftentimes, such heating elements are provided within a frame that may contact or rest beneath a lower interior surface of the cooktop plate. Moreover, multiple heating elements (e.g., of varying sizes, shapes, or diameters) may be provided, such as to accommodate cooking utensils of different sizes. Although each of the heating elements may have a different corresponding frame that rests on or at least partially supports the cooktop plate, certain issues exist with the mounting or support structures for existing cooktop appliances.

One such issues is accounting for movement or deflection of the cooktop appliance. For instance, although the cooktop plate may be a generally rigid structure, deflection of the cooktop plate may occur, such as during shipping of the cooktop appliance or in response to the weight of cooking utensils on the cooktop plate. This may, in turn, deflect or press against the frame(s) supporting heating elements. Under certain conditions, this may cause one or more of the frames to unevenly deflect or rub against the cooktop plate—either of which may damage the cooktop appliance (e.g., during shipment or use).

As a result, it would be useful to provide a cooktop appliance that could address one or more of the above issues. For instance, an appliance with one or more features for ensuring the even or reliable distribution of force or deflection of the cooktop appliance (e.g., in an easily assembled configuration).

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a cooktop appliance is provided. The cooktop appliance may include a cooktop plate, a support panel, a raised ridge, a mounting spring, a heater frame, and an electric heating element. The cooktop plate may define an upper cooking surface. The support panel may be disposed below the cooktop plate. The raised ridge may be disposed on the support panel. The raised ridge may define an elevated surface above the support panel. The mounting spring may be mounted to the raised ridge and extend above the elevated surface. The heater frame may be supported on the mounting spring below the cooktop plate. The electric heating element may be mounted within the heater frame below the cooktop plate.

In another exemplary aspect of the present disclosure, a cooktop appliance is provided. The cooktop appliance may include a cooktop plate, a support panel, a raised ridge, a first mounting spring (MS1), a first heater frame, a first electric heating element, a second mounting spring (MS2), a second heater frame, and a second electric heating element. The cooktop plate may define an upper cooking surface. The support panel may be disposed below the cooktop plate. The raised ridge may be disposed on the support panel. The raised ridge may define an elevated surface above the support panel. The MS1 may be mounted to the raised ridge and extend above the elevated surface. The first heater frame may be supported on the MS1 below the cooktop plate. The first electric heating element may be mounted within the first heater frame below the cooktop plate. The MS2 may be mounted to a portion of the support panel below the elevated surface relative to a vertical direction and horizontally spaced apart from the raised ridge. The MS2 may be formed as an identical spring to the MS1. The second heater frame may be supported on the MS2 below the cooktop plate. The second electric heating element may be mounted within the second heater frame below the cooktop plate.

In yet another exemplary aspect of the present disclosure, a cooktop appliance is provided. The cooktop appliance may include a cooktop plate, a support panel, a raised ridge, a mounting spring, a heater frame, and an electric heating element. The cooktop plate may define an upper cooking surface and a bottom interior surface. The support panel may be disposed below the cooktop plate. The support panel may define a lateral width along a lateral direction between a first lateral side and a second lateral side. The raised ridge may be disposed on the support panel at a location between 25% to 75% of the lateral width. The raised ridge may include an embossing defining an elevated surface above the support panel. The mounting spring may be mounted to the raised ridge and extend above the elevated surface. The heater frame may be disposed above the mounting spring in contact with the bottom interior surface. The electric heating element may be mounted within the heater frame below the cooktop plate.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
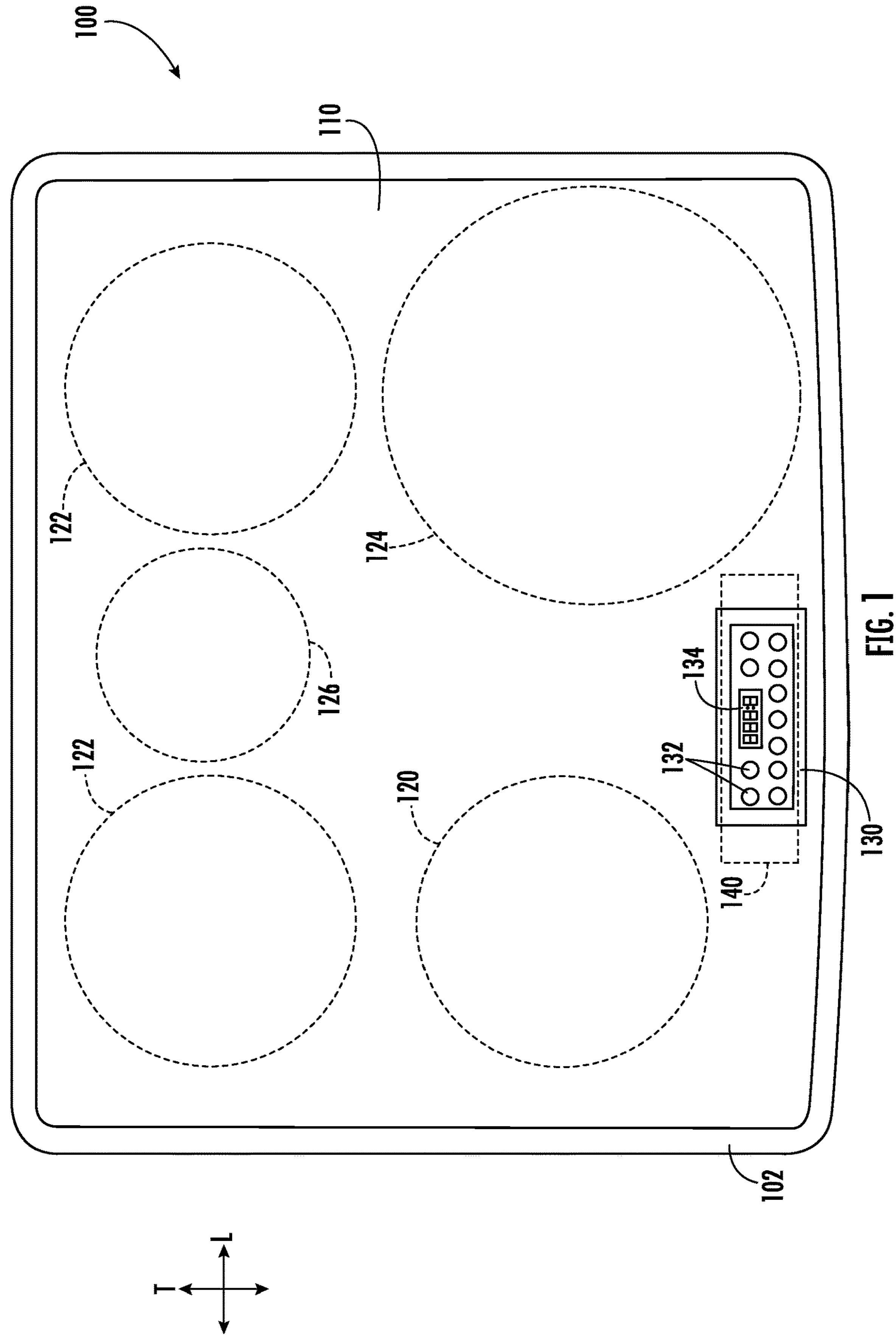
FIG. 1 provides a top, plan view of a cooktop appliance according to exemplary embodiments of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components or systems. For example, the approximating language may refer to being within a 10 percent margin (i.e., including values within ten percent greater or less than the stated value). In this regard, for example, when used in the context of an angle or direction, such terms include within ten degrees greater or less than the stated angle or direction (e.g., "generally vertical" includes forming an angle of up to ten degrees in any direction, such as, clockwise or counterclockwise, with the vertical direction V).

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Turning now to the figures, FIG. 1 provides a top, plan view of a cooktop appliance 100 according to exemplary embodiments of the present disclosure. Cooktop appliance 100 can be installed in various locations such as in cabinetry in a kitchen, with one or more ovens to form a range appliance, or as a standalone appliance. Thus, as used herein, the term "cooktop appliance" includes grill appliances, stove appliances, range appliances, and other appliances that incorporate cooktops.

According to exemplary embodiments, appliance 100 includes a cabinet 102 that is generally configured for containing or supporting various components of appliance 100 and which may also define one or more internal chambers or compartments of appliance 100. In this regard, as used herein, the terms "cabinet," "housing," and the like are generally intended to refer to an outer frame or support structure for appliance 100, (e.g., including any suitable number, type, and configuration of support structures formed from any suitable materials, such as a system of elongated support members, a plurality of interconnected panels, or some combination thereof.) It should be appreciated that cabinet 102 does not necessarily require an enclosure and may simply include open structure supporting various elements of appliance 100. By contrast, cabinet 102 may enclose some or all portions of an interior of cabinet 102. It should be appreciated that cabinet 102 may have any suitable size, shape, and configuration while remaining within the scope of the present subject matter.

Cabinet 102 generally defines a mutually orthogonal vertical, lateral, and transverse direction. Cabinet 102 extends between a top and a bottom along the vertical direction V, between a first side (e.g., the left side when viewed from the front as in FIG. 1) and a second side (e.g., the right side when viewed from the front as in FIG. 1) along the lateral direction L, and between a front and a rear along the transverse direction T. In general, terms such as "left," "right," "front," "rear," "top," or "bottom" are used with reference to the perspective of a user accessing appliance 100.

Figure 3:
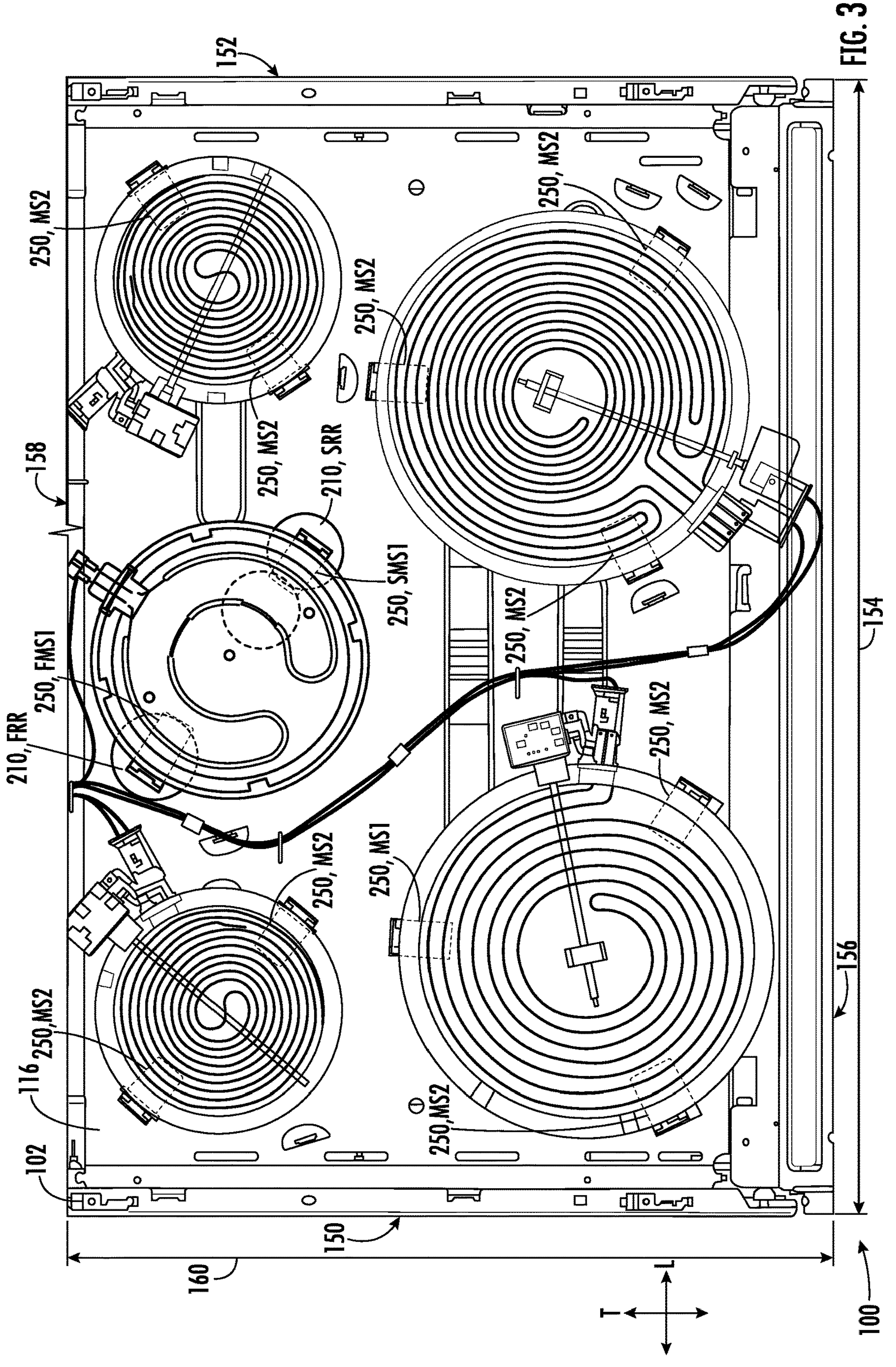
FIG. 3 provides another top, plan view of a portion of the exemplary cooktop appliance of FIG. 1, wherein various portions have been removed or visually modified for clarity.

Cooktop appliance 100 includes a cooktop plate 110 (e.g., mounted to cabinet 102) for supporting cooking utensils, such as pots or pans, on a cooking or top surface 114 of cooktop plate 110. Optionally, cooktop plate 110 may be fixed or secured to cabinet 102 at its perimeter edge (e.g., such that the sides or edges of cooktop plate 110 rest on a more rigid structure—or are otherwise prevented from deflected more than—a central portion of cooktop plate 110). When assembled, a top surface 114 is directed vertically upward to contact cooking utensils, while a bottom interior surface 112 is directed vertically downward opposite the top surface 114 (e.g., toward a support panel 116 mounted below cooktop plate 110). Cooktop plate 110 may be any suitable rigid plate, such as one formed of ceramic or glass (e.g., glass ceramic). As will be described in greater detail below, one or more electric heating assemblies 120,

122, 124 are mounted below cooktop plate 110 such that heating assemblies 120, 122, 124, and 126 are positioned below cooktop plate 110 (e.g., below the bottom interior surface 112 along the vertical direction V—FIG. 3). Cooktop plate 110 may be continuous over heating assemblies 120, 122, 124, and 126. Thus, no holes may extend vertically through cooktop plate 110 above heating assemblies 120, 122, 124, and 126. However, it will be understood that a hole may extend through cooktop plate 110 at one of heating assemblies 120, 122, 124, and 126, in certain exemplary embodiments.

Figure 2:
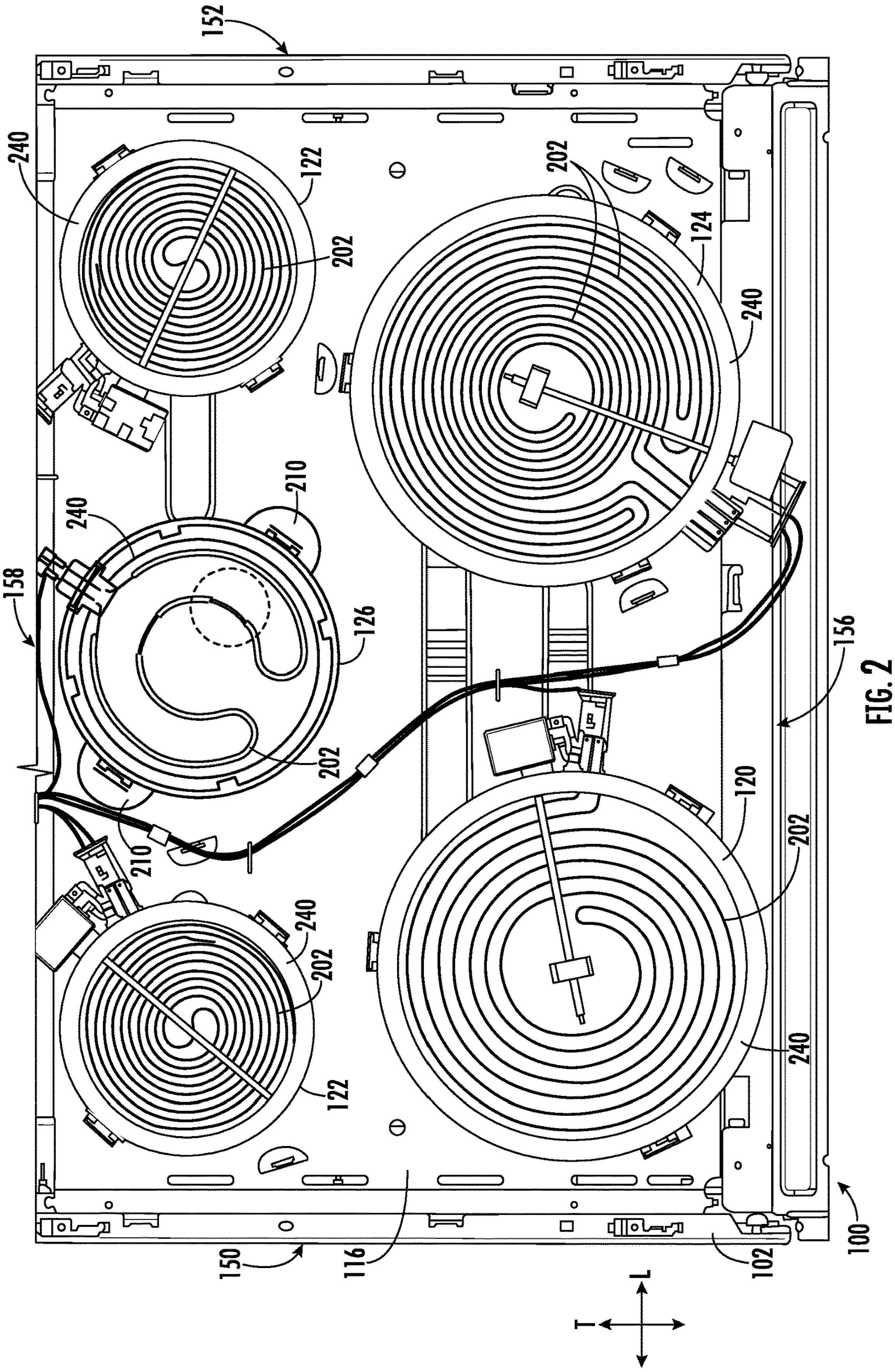
FIG. 2 provides a top, plan view of a portion of the exemplary cooktop appliance of FIG. 1, wherein a cooktop plate has been removed for clarity.

While shown with four heating assemblies 120, 122, 124, and 126 in the exemplary embodiment of FIG. 1, cooktop appliance 100 may include any number of heating assemblies 120, 122, 124, and 126 in alternative embodiments. Heating assemblies 120, 122, 124, and 126 can also have various diameters. For example, each heating assembly of heating assemblies 120, 122, 124, and 126 can have a different diameter, the same diameter, or any suitable combination thereof. In addition, the heating elements 120, 122, 124, and 126 may include differing numbers or shapes of heating elements 202 (FIG. 2), as shown. Nonetheless, cooktop appliance 100 is provided by way of example only and is not limited to the exemplary embodiment shown in FIG. 1. For example, a cooktop appliance having one or more radiant heating assemblies in combination with one or more electric resistance or gas burner heating elements can be provided. In addition, various combinations of number of heating assemblies, position of heating assemblies or size of heating assemblies can be provided. It will also be understood that the present subject matter is suitable for use with other electric heating elements, such as induction heating elements.

Generally, a user interface 130 provides visual information to a user and allows a user to select various options for the operation of cooktop appliance 100. For example, displayed options can include a desired heating assemblies 120, 122, 124, and 126, a desired cooking temperature, or other options. User interface 130 can be any type of input device and can have any configuration. In FIG. 1, user interface 130 is located within a portion of cooktop plate 110. Alternatively, user interface 130 can be positioned on a vertical surface near a front side of cooktop appliance 100 or at another location that is convenient for a user to access during operation of cooktop appliance 100.

In some embodiments, such as that shown in FIG. 1, user interface 130 includes a capacitive touch screen input device component 132. Capacitive touch screen input device component 132 can allow for the selective activation, adjustment or control of any or all heating assemblies 120, 122, 124, and 126 as well as any timer features or other user adjustable inputs. One or more of a variety of electrical, mechanical, or electro-mechanical input devices including rotary dials, push buttons, toggle/rocker switches, or touch pads can also be used singularly or in combination with capacitive touch screen input device component 132. User interface 130 also includes a display component 134, such as a digital or analog display device designed to provide operational feedback to a user.

Generally, cooktop appliance 100 includes a controller 140. Operation of cooktop appliance 100 is regulated by controller 140. Controller 140 is operatively coupled or in communication with various components of cooktop appliance 100, including user interface 130. In response to user manipulation of the user interface 130, controller 140 operates the various components of cooktop appliance 100 to execute selected cycles and features.

Controller 140 may include memory (e.g., non-transitory media) and microprocessor, such as a general or special purpose microprocessor operable to execute programming instructions or micro-control code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 140 may be constructed without using a microprocessor (e.g., using a combination of discrete analog or digital logic circuitry, such as switches, amplifiers, integrators, comparators, flip-flops, AND gates, and the like) to perform control functionality instead of relying upon software. Heating assemblies (e.g., 120, 124, 122, or 126), user interface 130 and other components of cooktop appliance 100 may be in communication with controller 140 via one or more signal lines or shared communication busses.

Turning now generally to FIGS. 2 through 6, various portions of the exemplary appliance 100 are illustrated and will be described in greater detail. As shown, a support panel 116 disposed below (e.g., beneath) the cooktop plate 110. For instance, support panel 116 may be mounted to cabinet 102 (or adjacent structure) via one or more suitable mechanical fasteners, adhesives, etc.—as would be understood. Thus, support panel 116 is generally fixed relative to cooktop plate 110 (though relative deflection of either may occur, such as during use or shipping). Moreover, support panel 116 may be spaced apart from cooktop plate 110 along the vertical direction V. An upper surface 118 of support panel 116 may be directed upwards towards the bottom interior surface 112 of cooktop plate 110. In turn, an enclosure gap or cavity 104 may be defined between support panel 116 and cooktop plate 110 (e.g., by the vertical distance between upper surface 118 and bottom interior surface 112). Generally, support panel 116 may be formed from any suitable rigid, high-heat material, such as a metal material formed from a stainless steel or aluminum sheet (e.g., including alloys thereof).

As shown, support panel 116 or upper surface 118 may extend along the lateral direction L from a first lateral side 150 to a second lateral side 152. In turn, a lateral width 154 is defined between the first lateral side 150 and the second lateral side 152 (e.g., along or relative to the lateral direction L). Similarly, support panel 116 or upper surface 118 may extend along the transverse direction T from a front end 156 to a rear end 158. In turn, a transverse depth 160 is defined between the front end 156 and the rear end 158 (e.g., along or relative to the transverse direction T).

Support panel 116 itself may generally provide a flat upper surface 118. Although one or more slots, apertures, or bends may be formed in the support panel 116 (e.g., via stamping or bending processes), such as for accepting one or more fasteners or increasing rigidity, upper surface 118 may generally extend along a horizontal plane (e.g., parallel to cooktop plate 110). Nonetheless, one or more raised ridges 210 may be disposed on the support panel 116. For instance, such raised ridges 210 may be secured to or formed with support panel 116 (e.g., to define an elevated surface 212 above upper surface 118).

In the illustrated embodiments, multiple raised ridges 210 are provided as discrete embossings, each extending upward from the support panel 116 (e.g., at the upper surface 118) and integral therewith. When assembled each embossing 210 defines a corresponding elevated surface 212 above (e.g., higher along the vertical direction V) than support panel 116 (e.g., at upper surface 118). In turn, elevated surface 212 may provide a surface (e.g., flat surface) that is higher than the surrounding portions of support panel 116. Moreover, each embossing (or raised ridge 210, generally) may define a corresponding vertical height 214 that extends from the support panel 116 (e.g., at upper surface 118) to the elevated surface 212. In some embodiments, the vertical height 214 is between 0.05 inches and 0.5 inches. In certain embodiments, the vertical height 214 is about 0.05 inches.

The exact location of the raised ridge 210 may vary according to the specific appliance model into which it is provided. Nonetheless, in some embodiments, the raised ridge(s) 210 is/are disposed at a location between 25% to 75% of the lateral width 154. For instance, one or more raised ridges 210 may be disposed within the lateral middle third of the support panel 116 (i.e., such that each ridge 210 is disposed at a corresponding location that is between 33% to 66% of the lateral width 154). In additional or alternative embodiments, the raised ridge(s) 210 is/are disposed at a location between 50% to 100% of the transverse depth 160 (e.g., proximal to the rear end 158 and, thus, distal to the front end 156). For instance, one or more raised ridges 210 may be disposed within the rear half of the support panel 116 within 10% of the rear end 158 (i.e., such that each ridge is disposed at a corresponding location that is between 51% to 90% of the transverse depth 160). Notably, potential deflection of the cooktop plate 110 or support panel 116 (e.g., during use or shipping) may be relatively large at the location of the raised ridge 210.

As noted above, the heating assemblies 120, 122, 124, and 126 are generally disposed below cooktop plate 110. Specifically, heating assemblies 120, 122, 124, and 126 are mounted between support panel 116 and cooktop plate 110 relative to the vertical direction V. In some embodiments, one or more of the heating assemblies (e.g., heating assembly 126) includes a frame 240 on which one or more heating elements (e.g., heating elements 202) are supported. As would be understood, frame 240 may include a number of discrete parts and materials to support and enclose heating elements 202. In particular, frame 240 may include a suitable base wall 242 and insulated wall 244 extending from base wall 242 (e.g., in the vertical direction V towards cooktop plate 110). Optionally, a metal pan 248 may further enclose at least a portion (e.g., bottom portion) of base wall 242 or insulated wall 244.

When assembled, frame 240 is positioned below cooktop plate 110. In particular, insulated wall 244 may be positioned beneath bottom interior surface 112. An upper edge of insulated wall 244 may even rest against or contact bottom interior surface 112 (e.g., directly or indirectly, such as through an intermediate rim or gasket). As shown, frame 240 may circumferentially surrounds one or more electric heating elements 202. For example, insulated wall 244 may be formed as a circular ring or loop (e.g., as a toroid having a rectangular cross section) positioned about center point (e.g., coaxial to heating elements 202). Thus, insulated wall 244 may bound (e.g., extend about) the perimeter of the footprint of the corresponding heating elements 202. Generally, insulated wall 244 includes or is formed from any suitable insulation material, such as ceramic or metallic insulation materials.

The heating assemblies 120, 122, 124, or 126 may generally be supported on support panel 116. In some embodiments, one or more mounting springs 250 are provided to support one or more of the heating assemblies 120, 122, 124, and 126 on support panel 116 to bias a corresponding heating assembly upward. Thus, such mounting springs 250 may each be disposed between support panel 116 and at least a portion of a corresponding heater frame 240. Optionally, such mounting springs 250 may be secured to support panel 116, such as by one or more suitable mechanical fasteners or adhesives.

The mounting spring(s) 250 may be provided as any suitable compression spring structure. For instance, a mounting spring 250 may be provided as a suitable leaf spring, torsion spring, coil spring, etc. formed from a suitable material (e.g., stainless steel or aluminum, including alloys thereof). Thus, as a heating assembly is forced or deflected downward, a corresponding mounting spring 250 may counteract or such deflection to bias the corresponding heating assembly upward. Additionally or alternatively, mounting spring 250 may hold the corresponding heating assembly in tension (e.g., biased against a bottom interior surface 112 of cooktop plate 110). In optional embodiments, multiple mounting springs 250 may be provided as identical springs (i.e., formed from the same material and having substantially the same size and shape at the time of assembly of appliance 100 or in the assembled form). For instance, multiple heating assemblies (e.g., 120, 122, 124, 126) may be supported by mounting springs 250 that are identical to each other. Advantageously, the use of identical springs may reduce costs or otherwise ease assembly while ensuring the correct mounting spring is provided at the corresponding heating assembly.

Figure 4:
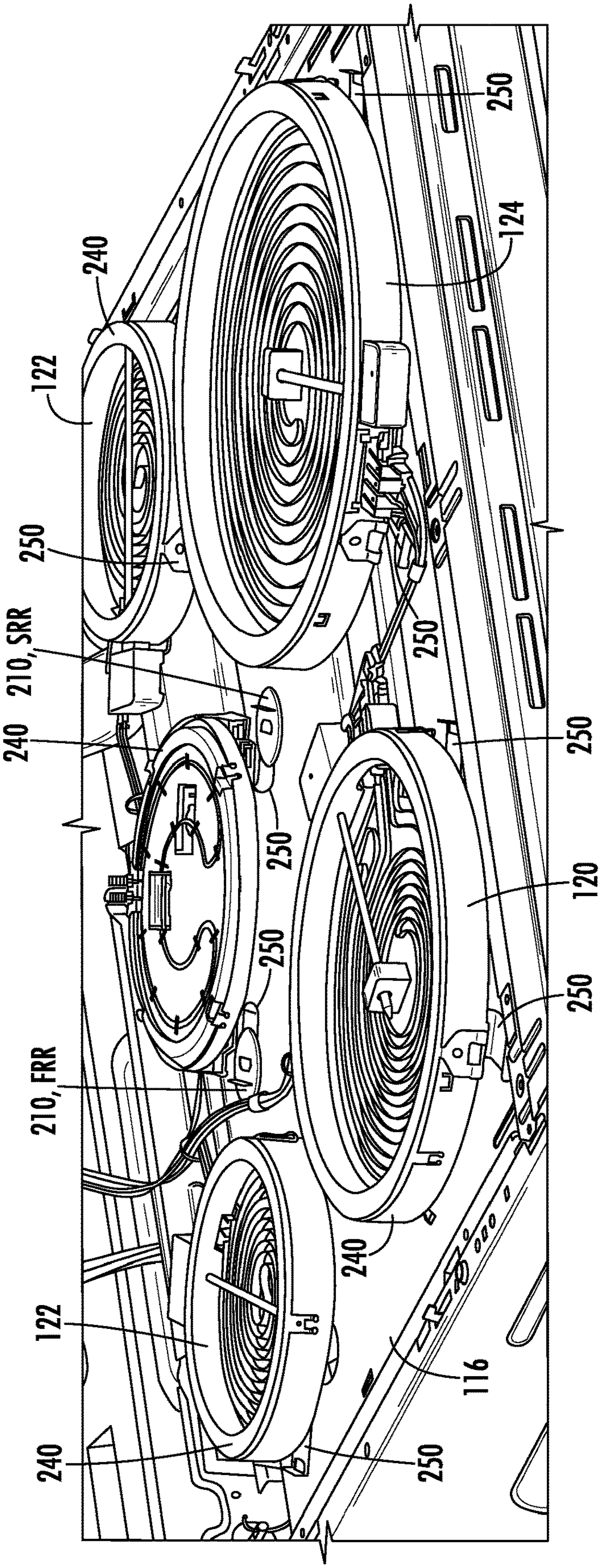
FIG. 4 provides a perspective view of the exemplary cooktop appliance of FIG. 2.
Figure 5:
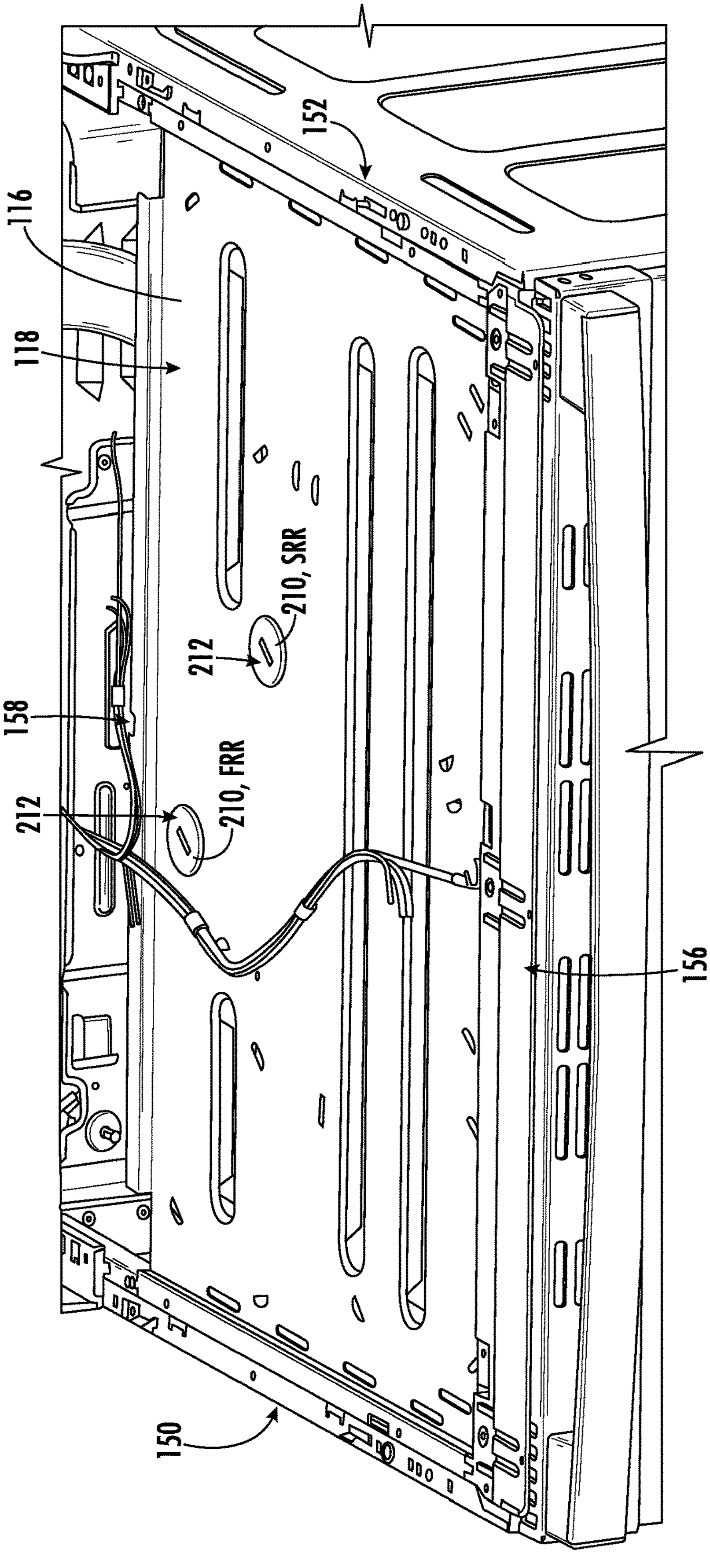
FIG. 5 provides a perspective view of a support panel of the exemplary cooktop appliance of FIG. 2.
Figure 6:
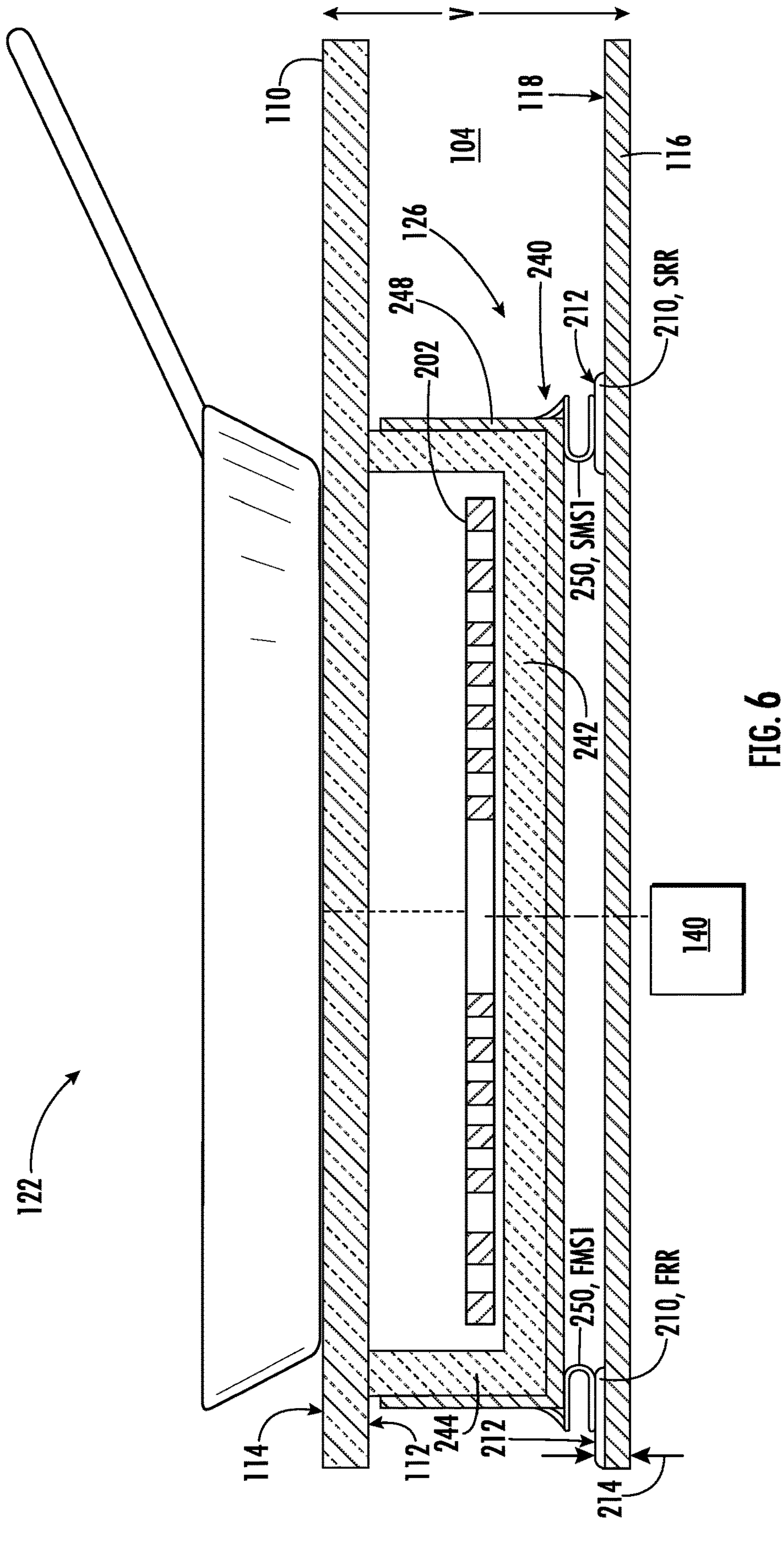
FIG. 6 provides a cross-sectional, schematic, elevation view of certain components of the heating assembly and cooktop appliance of FIG. 2.

Turning especially to FIGS. 4 through 6, one or more mounting springs 250 may support a specific heating assembly (e.g., heating assembly 126) at one or more corresponding raised ridges 210. For instance, a mounting spring 250 may be mounted to the raised ridge 210 and extending above the elevated surface 212. Thus, the mounting spring 250 may rest on the corresponding raised ridge 210 and be held above at least a portion of the upper surface 118. In the illustrated embodiments, a separate first heater mounting spring 250 (FMS1) and second heater mounting spring 250 (SMS1) are provided for a single corresponding heater frame 240 or heater assembly (e.g., heater assembly 126). The FMS1 rests on a first raised ridge 210 (FRR) while the SMS1 rests (or is secured) on a second raised ridge 210 (SRR). As shown, the SRR defines a separate elevated surface 212 that is horizontally spaced apart from the FRR (e.g., to define a vertical height 214 that is identical or, alternatively, different from the vertical height 214 of the FRR). Notably, the raised ridge 210 may compensate for increased deflection that may otherwise occur on the corresponding heating assembly 126 (e.g., relative to the other heating assemblies or portions of cooktop plate 110).

Returning generally to FIGS. 2 through 6, although at least one mounting spring 250 (e.g., FMS1 or SMS1) is supported on a corresponding raised ridge 210 (e.g., FRR or SRR), one or more other mounting springs 250 may rest (or be supported) on support panel 116. In particular, one or more second mounting springs 250 (MS2) may support a heating assembly (e.g., second heating assembly 120, 122, or 124) that is distinct from the heating assembly supported by FMS1 or SMS1 (e.g., first heating assembly 126). For instance, at least one MS2 may mounted to the support panel 116 (e.g., at upper surface 118) apart from the raised ridge 210. Specifically, MS2 may extend from a corresponding heater frame 240 to a portion of the support panel 116 below the elevated surface 212 relative to a vertical direction V (i.e., lower relative to the vertical direction V). Thus, the second heater frame 240 may be supported on one or more MS2.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A cooktop appliance, comprising:

a cooktop plate defining an upper cooking surface;

a support panel disposed below the cooktop plate;

a raised ridge disposed on the support panel, the raised ridge defining an elevated surface above the support panel;

a mounting spring mounted to the raised ridge and extending above the elevated surface;

a heater frame supported on the mounting spring below the cooktop plate; and an electric heating element mounted within the heater frame below the cooktop plate, wherein the support panel extends along a lateral direction from a first lateral side to a second lateral side, wherein a lateral width is defined between the first lateral side and the second lateral side, wherein the raised ridge disposed at a location between 25% to 75% of the lateral width, wherein the raised ridge comprises an embossing formed and extending upward from the support panel to be integral therewith, and wherein the mounting spring is positioned between the elevated surface and the support panel such that the raised ridge is spaced apart from the support panel along a vertical direction.

2. The cooktop appliance of claim 1, wherein the heater frame contacts the cooktop plate at a bottom interior surface opposite the upper cooking surface.

3. The cooktop appliance of claim 1, wherein the raised ridge is a first raised ridge (FRR), wherein the mounting spring is a first heater mounting spring (FMS), and wherein the cooktop appliance further comprises:

a second raised ridge (SRR) disposed on the support panel, the SRR being horizontally spaced apart from the FRR and defining an elevated surface apart from the elevated surface of the FRR; and a second heater mounting spring (SMS) mounted to the SRR in support of the heater frame, the SMS extending above the elevated surface of the SRR.

4. The cooktop appliance of claim 1, wherein the heater frame is a first heater frame, wherein the electric heating element is a first electric heating element; and wherein the cooktop appliance further comprises:

a second heater frame mounted to the support panel below the cooktop plate, the second heater frame being horizontally spaced apart from the raised ridge and the first heater frame; and a second electric heating element mounted within the second heater frame below the cooktop plate.

5. The cooktop appliance of claim 4, wherein the mounting spring is a first mounting spring (MS1), and wherein the cooktop appliance further comprises:

a second mounting spring (MS2) mounted to the support panel and extending from the second heater frame to a portion of the support panel below the elevated surface relative to a vertical direction, the second heater frame being supported on the MS2.

6. The cooktop appliance of claim 4, wherein the mounting spring is a first mounting spring (MS1), and wherein the cooktop appliance further comprises:

a second mounting spring (MS2) mounted to the support panel and extending from the second heater frame to a portion of the support panel, the second heater frame being supported on the MS2, wherein the MS2 is formed as an identical spring to the MS1.

7. The cooktop appliance of claim 1, wherein the support panel extends along a transverse direction from a front end to a rear end, wherein a transverse depth is defined between the front end and the rear end, and the raised ridge disposed at a location between 50% to 100% of the transverse depth.

8. The cooktop appliance of claim 1, wherein the raised ridge defines a vertical height from the support panel to the elevated surface, the vertical height being between 0.05 inches and 0.5 inches.

9. The cooktop appliance of claim 1, wherein the mounting spring is supported on the elevated surface.

10. A cooktop appliance, comprising:

a cooktop plate defining an upper cooking surface;

a support panel disposed below the cooktop plate;

a raised ridge disposed on the support panel, the raised ridge defining an elevated surface above the support panel;

a first mounting spring (MS1) mounted to the raised ridge and extending above the elevated surface;

a first heater frame supported on the MS1 below the cooktop plate;

a first electric heating element mounted within the first heater frame below the cooktop plate;

a second mounting spring (MS2) mounted to a portion of the support panel below the elevated surface relative to a vertical direction and horizontally spaced apart from the raised ridge, the MS2 being formed as an identical spring to the MS1;

a second heater frame supported on the MS2 below the cooktop plate; and a second electric heating element mounted within the second heater frame below the cooktop plate, wherein the support panel extends along a lateral direction from a first lateral side to a second lateral side, wherein a lateral width is defined between the first lateral side and the second lateral side, wherein the raised ridge disposed at a location between 25% to 75% of the lateral width, wherein the raised ridge comprises an embossing formed and extending upward from the support panel to be integral therewith, and wherein the mounting spring is positioned between the elevated surface and the support panel such that the raised ridge is spaced apart from the support panel along a vertical direction.

11. The cooktop appliance of claim 10, wherein the first and second heater frames contact the cooktop plate at a bottom interior surface opposite the upper cooking surface.

12. The cooktop appliance of claim 10, wherein the raised ridge is a first raised ridge (FRR), wherein the MS1 is a first heater mounting spring (FMS1), and wherein the cooktop appliance further comprises:

a second raised ridge (SRR) disposed on the support panel, the SRR being horizontally spaced apart from the FRR and defining an elevated surface apart from the elevated surface of the FRR; and a second heater mounting spring (SMS1) mounted to the SRR in support of the first heater frame, the SMS1 extending above the elevated surface of the SRR.

13. The cooktop appliance of claim 10, wherein the support panel extends along a transverse direction from a front end to a rear end, wherein a transverse depth is defined between the front end and the rear end, and the raised ridge disposed at a location between 50% to 100% of the transverse depth.

14. The cooktop appliance of claim 10, wherein the raised ridge defines a vertical height from the support panel to the elevated surface, the vertical height being between 0.05 inches and 0.5 inches.

15. The cooktop appliance of claim 10, wherein the MS1 is supported on the elevated surface.

16. A cooktop appliance, comprising:

a cooktop plate defining an upper cooking surface and a bottom interior surface;

a support panel disposed below the cooktop plate, the support panel defining a lateral width along a lateral direction between a first lateral side and a second lateral side;

a raised ridge disposed on the support panel at a location between 25% to 75% of the lateral width, the raised ridge comprising an embossing defining an elevated surface above the support panel;

a mounting spring mounted to the raised ridge and extending above the elevated surface;

a heater frame disposed above the mounting spring in contact with the bottom interior surface; and an electric heating element mounted within the heater frame below the cooktop plate, wherein the mounting spring is positioned between the elevated surface and the support panel such that the raised ridge is spaced apart from the support panel along a vertical direction.

17. The cooktop appliance of claim 16, wherein the support panel extends along a transverse direction from a front end to a rear end, wherein a transverse depth is defined between the front end and the rear end, and the raised ridge disposed at a location between 50% to 100% of the transverse depth.

18. The cooktop appliance of claim 16, wherein the embossing defines a vertical height from the support panel to the elevated surface, the vertical height being between 0.05 inches and 0.5 inches.

19. The cooktop appliance of claim 16, wherein the mounting spring is supported on the elevated surface.

* * * * *